United States Patent
Nishikawa

(10) Patent No.: US 6,714,358 B2
(45) Date of Patent: Mar. 30, 2004

(54) LENS BARREL, AND CAM BARREL MOLDING DIE

(75) Inventor: Katsuhiko Nishikawa, Saitama (JP)

(73) Assignee: Tamron Co., Ltd., Saitama (JP)

(*) Notice: Subject to any disclaimer, the term of this patent is extended or adjusted under 35 U.S.C. 154(b) by 22 days.

(21) Appl. No.: 10/084,991

(22) Filed: Mar. 1, 2002

(65) Prior Publication Data
US 2002/0122263 A1 Sep. 5, 2002

(30) Foreign Application Priority Data
Mar. 1, 2001 (JP) ........................ 2001-056156

(51) Int. Cl.7 .................................. G02B 7/04
(52) U.S. Cl. ...................................... 359/699
(58) Field of Search .................. 359/699, 700, 359/701

(56) References Cited

U.S. PATENT DOCUMENTS

| | | | | |
|---|---|---|---|---|
| 5,210,644 A | * | 5/1993 | Nomura | 359/694 |
| 6,195,212 B1 | * | 2/2001 | Miyamoto | 359/699 |
| 6,549,341 B2 | * | 4/2003 | Nomura et al. | 359/699 |
| 2002/0105731 A1 | * | 8/2002 | Iikawa et al. | 359/694 |

FOREIGN PATENT DOCUMENTS

| | | | | |
|---|---|---|---|---|
| JP | 05257047 | | 10/1993 | |
| JP | 05257047 A | * | 10/1993 | G02B/7/04 |
| JP | 06018757 | | 1/1994 | |
| JP | H09-203850 | | 8/1997 | G02B/7/10 |
| JP | H09-203851 | | 8/1997 | G02B/7/10 |
| JP | 2773586 | | 4/1998 | G02B/7/04 |
| JP | 11174305 | | 7/1999 | |
| JP | H11-265765 | | 4/2001 | G02B/7/04 |

* cited by examiner

Primary Examiner—Scott J. Sugarman
Assistant Examiner—Deborah Raizen
(74) Attorney, Agent, or Firm—Jacobson Holman PLLC

(57) ABSTRACT

A lens barrel having a cam barrel is disclosed. The cam barrel is molded by die-cutting in radial and other directions relative to the optical axis so as to have raised cams without undercuts if the raised cams are even partially lined up fore and behind one another along the optical axis, and there is no parting line in either the cam grooves nor the raised cams. The cam barrel has its outer surface provided with raised cams and is made of synthetic resin, and each of the raised cams has at least one of cam faces inclined toward an opposite cam face off a radial direction relative to an optical axis of the cam barrel.

2 Claims, 5 Drawing Sheets

LENS BARREL, AND CAM BARREL MOLDING DIE

FIELD OF THE INVENTION

The present invention relates to a lens barrel and a cam barrel molding die, and more particularly, it relates to a lens barrel included in a zoom lens and having movable multi-barrel and multi-lens built-in in combination with a cam barrel of synthetic resin, and a molding die used to produce such a cam barrel.

BACKGROUND ART

Japanese Patent Laid-Open No. H09-203850 discloses a mechanical assembly of a zoom adjusting element of a zoom lens which is made of synthetic resin and integrated with a cam element or a cam follower of cam mechanism.

Japanese Patent Laid-Open No. H09-203851 discloses a zoom lens which has a movable frame provided with a cam in relation with a first group of lenses, and a zoom adjusting ring having its inner surface formed with a cam follower in relation with the first group of lenses and also formed with a cam in relation with a second group of lenses, so that simply regulating the zoom adjusting ring enables the first and second groups of lenses to move relative to an optical axis.

Japanese Patent No. 2773586 discloses a zoom lens including a cam ring which has its raised cams molded with opposite cam faces, respectively, by die-cutting in directions along the optical axis, and the invention is characterized in that the cam face shaped by a static member of the die and the cam face shaped by a movable member of the die meet each other at parting line or seam along a raised portion made by the static and movable members of the die.

Japanese Patent Application No. H11-265765 discloses a zoom lens which has a cam barrel made of synthetic resin and formed with a cam in relation with a first group of lenses and cams in relation with at least two more groups of lenses, i.e., second, third, and so forth.

The cam ring having raised cams as described in Japanese Patent No. 2773586, which is suitable for use in a zoom lens, is molded by die-cutting in directions along the optical axis, and this unable to create the raised cams even partially lined up fore and behind one another along the optical axis, which resultantly disturbs down-sizing as having strongly been demanded recently.

The zoom lens set forth in Japanese Patent Application No. H11-265765 is configured to have the cam barrel provided with the cam in relation with the first group of lenses and the two or more cams in relation with the second and other groups of lenses. With this configuration, as can be seen in FIG. 6, the die is adapted to radially slide under a certain restriction in direction so as not to leave undercuts in locations of raised cams for the respective lens groups, and such restriction to and a design of the die lead to a creation of parting line 202 in cam surfaces of cam grooves 200 defined in the molded cam barrel. Consequently, in adjusting for the zooming, studs fitted in the cam grooves 200, while sliding along the cam surfaces of the cam grooves 200, bump into the parting line 202 with slight impact, namely, a light shock of tapping.

The present invention is intended to overcome the above-mentioned disadvantages of the prior art lens barrel of synthetic resin, and it is an object of the present invention to provide a lens barrel having a cam barrel which is molded by die-cutting in radial and other directions relative to the optical axis so as to have raised cams without undercuts if the raised cams are even partially lined up fore and behind one another along the optical axis, and a cam barrel molding die in which a cause of an undercut is eliminated.

It is another object of the present invention to provide a lens barrel having a cam barrel where there is no parting line in either the cam grooves nor the raised cams, and a cam barrel molding die to produce such a cam barrel.

SUMMARY OF THE INVENTION

A lens barrel according to the present invention includes a cam barrel which has its outer surface provided with raised cams and is made of synthetic resin, and in the cam barrel, each of the raised cams has at least one of cam faces inclined toward an opposite cam face off a radial direction relative to an optical axis of the cam barrel.

In another aspect of the present invention, a cam barrel, which is included in a lens barrel and made of synthetic resin, has cam grooves and raised cams in its outer surface, and each of the raised cams has at least one of cam faces inclined toward an opposite cam face off a radial direction relative to an optical axis of the cam barrel.

Furthermore, a die according to the present invention is designed to mold a cam barrel of synthetic resin which is suitable for use in a lens barrel and has raised cams in its outer surface, and each of the raised cams has at least one of cam faces inclined toward an opposite cam face off a radial direction relative to an optical axis of the cam barrel, so as not to leave an undercut in the raised cams.

In another aspect of the present invention, a die is designed to mold a cam barrel of synthetic resin which is suitable for use in a lens barrel and has cam grooves and raised cams in its outer surface, and each of the raised cams has at least one of cam faces inclined toward an opposite cam face off a radial direction relative to an optical axis of the cam barrel, so as not to leave an undercut in either the cam grooves or the raised cams.

These embodiments of the present invention are commonly characterized in that one of the cam faces extends in a radial direction relative to the optical axis. If both the cam faces of each of the raised cams are inclined toward the opposite cam faces off the radial direction relative to the optical axis, both the cam faces and cam followers must be shaped with high precisions. Additionally, short shot in molding is likely to occur where fused resin is insufficient at the top of the raised cam that is to be tapered in shape, which results in the truncated top of the raised cam being unsatisfactory in hardness.

DETAILED DESCRIPTION OF THE PREFERRED EMBODIMENT

Figure 1:
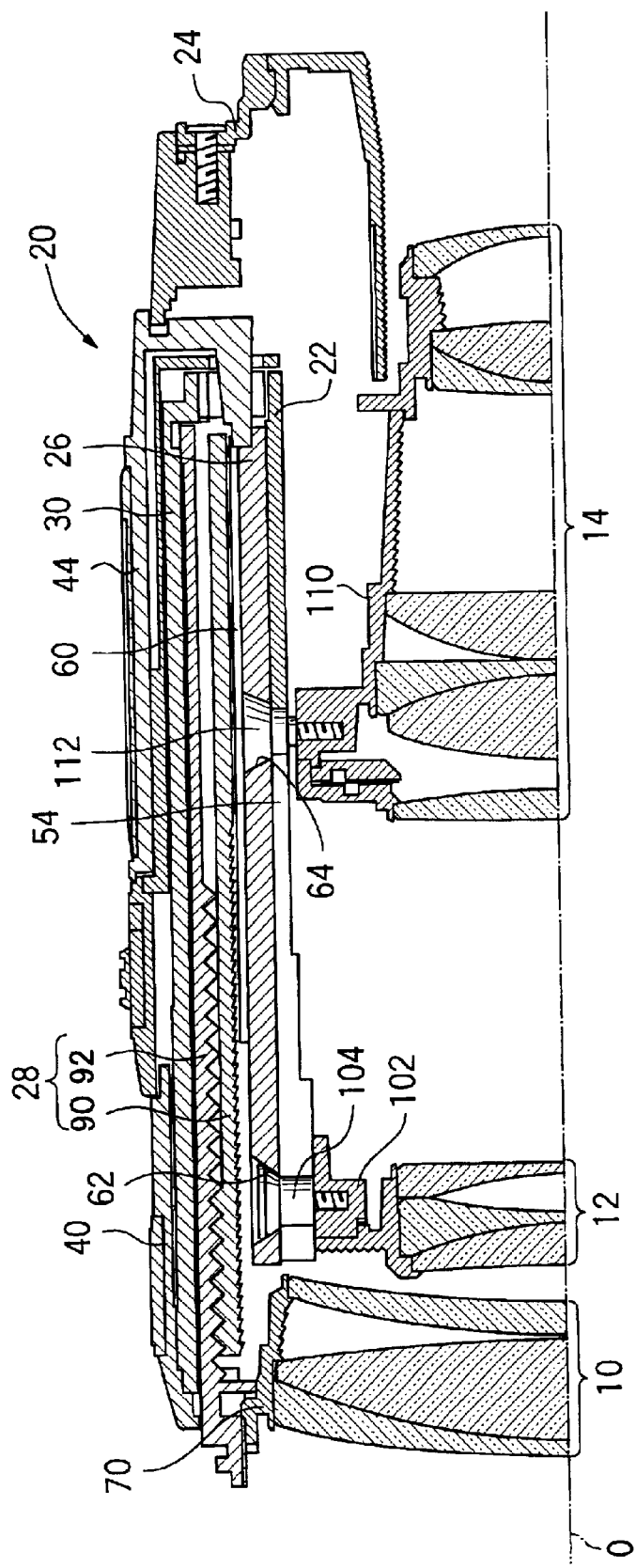
FIG. 1 is a sectional view showing an exemplary embodiment of a zoom lens according to the present invention being in wide-mode.

Optics of the zoom lens consists of a first group 10 of lenses having a positive power attribute for focusing, a second group 12 of lenses having a negative power attribute, and a third group 14 of lenses having a positive power attribute.

A zoom lens barrel 20 has a plurality of roughly cylindrical members which are mutually telescopic, including a first fixed barrel 22 fixed to a mount 24 and guiding the second and third groups 12 and 14 of lenses in parallel with the optical axis O, a cam barrel 26 sliding over the outer surface of the first fixed barrel 22, a barrel 28 in relation with the first group of lenses wand sliding over the outer surface of the fist fixed barrel 22, a second fixed barrel 30 fixed to the mount 24, a focus adjusting ring 40 rotating and simultaneously sliding over the outer surface of the second fixed barrel 30, and a zoom adjusting ring 44 rotating and simultaneously sliding over the outer surface of the second fixed barrel 30 behind the focus adjusting ring 40. The zoom adjusting ring 44 is coupled to the cam barrel 26 in proximal position or at the mount 24 to be a unit and pivot together about the optical axis O.

In the first fixed barrel 22, there are defined grooves 54 shared for linear movement by both the second and third groups 12 and 14 of lenses, and the barrel also has its front end embedded with a first stud 80 for linear movement. The first stud 80 is fitted in a groove 82 defined in the inner surface of the barrel 28 for linear movement of the first group of lenses.

Figure 3:
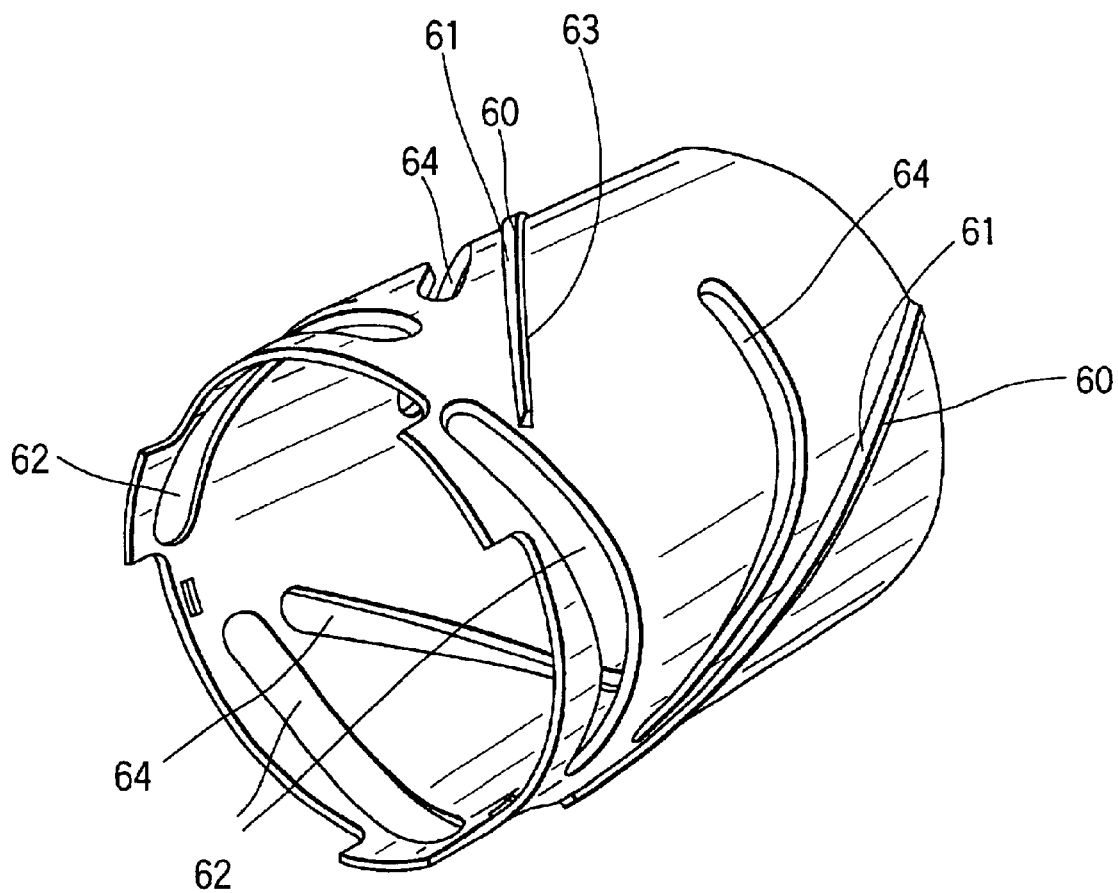
FIG. 3 is a perspective view showing an exemplary cam barrel for the zoom lens according to the present invention.
Figure 4:
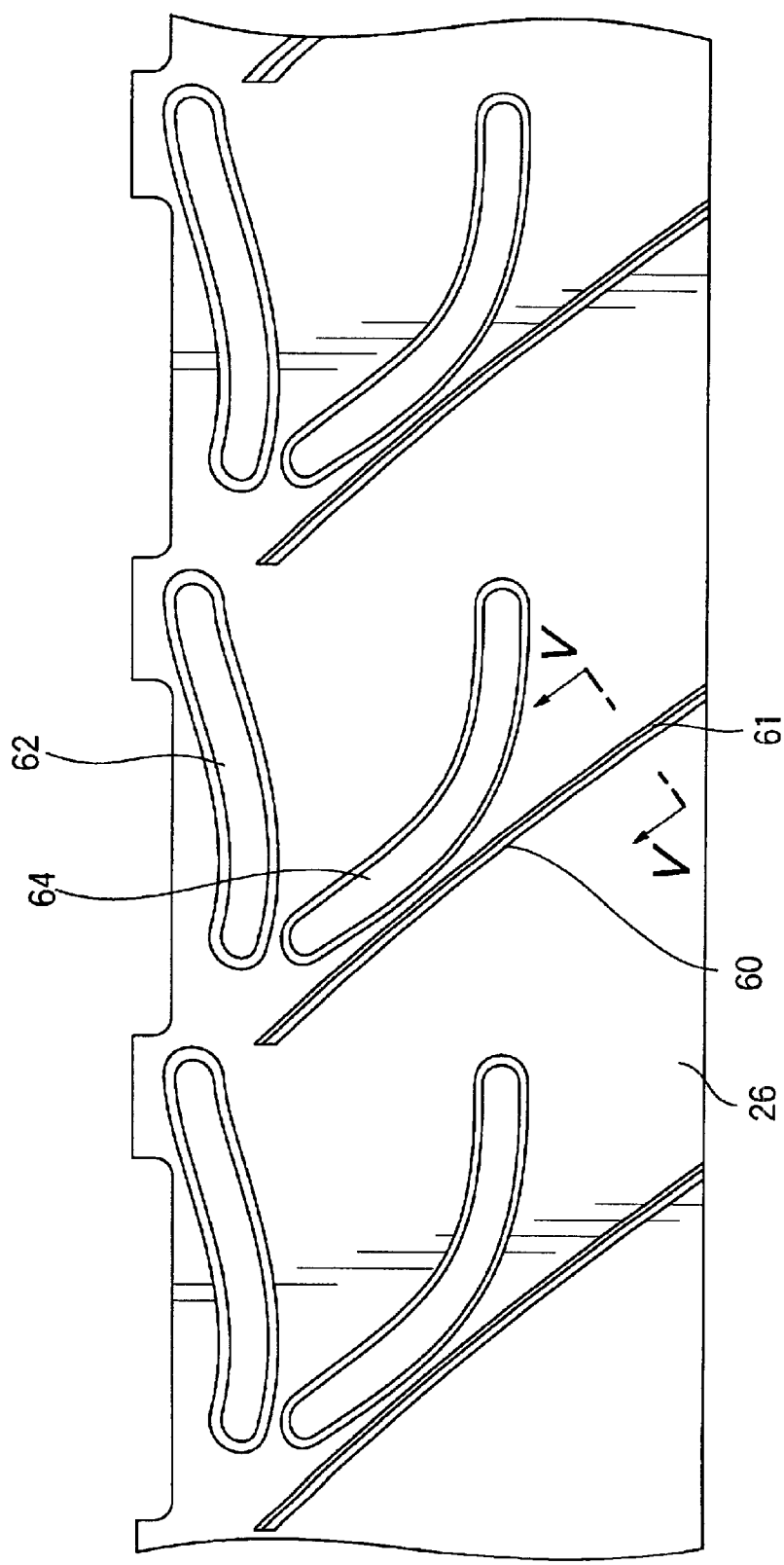
FIG. 4 is an exploded view illustrating the cam barrel for the zoom lens in FIG. 3.
Figure 5:
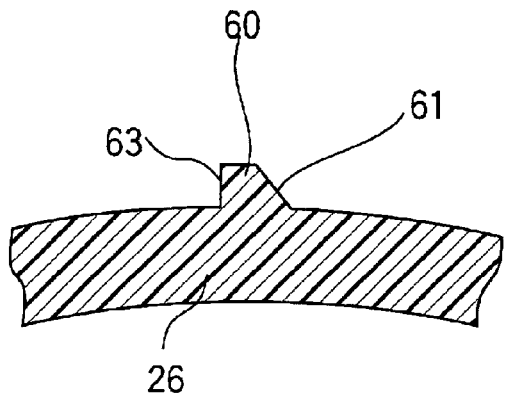
FIG. 5 is a partial sectional view taken along the line V—V of FIG. 4, showing a raised cam portion formed in the cam barrel for the zoom lens according to the present invention.
Figure 6:
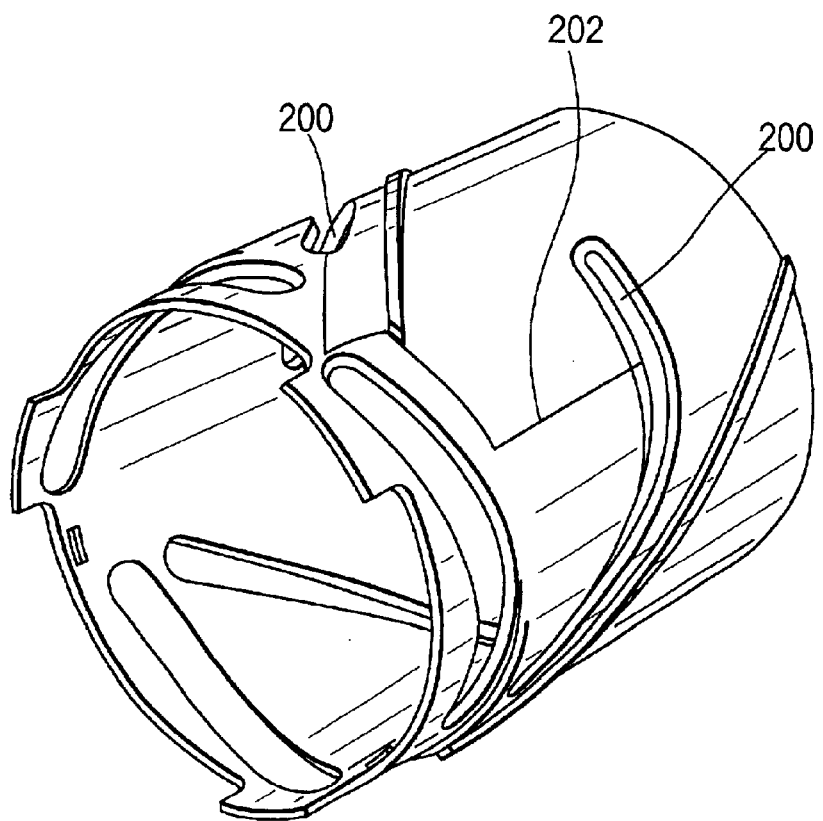
FIG. 6 is a perspective view showing a prior art embodiment of a lens barrel.

The cam barrel 26 of synthetic resin, as illustrated in FIGS. 3 and 5, includes raised cams 60 in relation with the first group of lenses and trapezoidal in vertical cross-section, second cam grooves 62 in relation with the second group of lenses and widened toward the outer circumference of the cam barrel, and third cam grooves 64 in relation with the third group of lenses and widened toward the outer circumference.

As shown in FIG. 5, each the raised cams 60 in relation with the first group of lenses has two faces opposite to each other, namely, a vertical face 63 radially extending outward from the optical axis O or perpendicular to a tangential plane with the curved outer surface of the cam barrel 26, and a tapering face 61 inclined to meet the vertical face 63. Such a raised cam 60 in relation with the first group of lenses does not have to have both of its respective cam faces and cam followers shaped with high precision, and short shot in molding is not caused; that is, fused resin might not be insufficient at the top of the raised cam that is to be tapered in shape, which is additionally advantageous in that the truncated top of the raised cam 60 is hard enough to resist impact.

Figure 2:
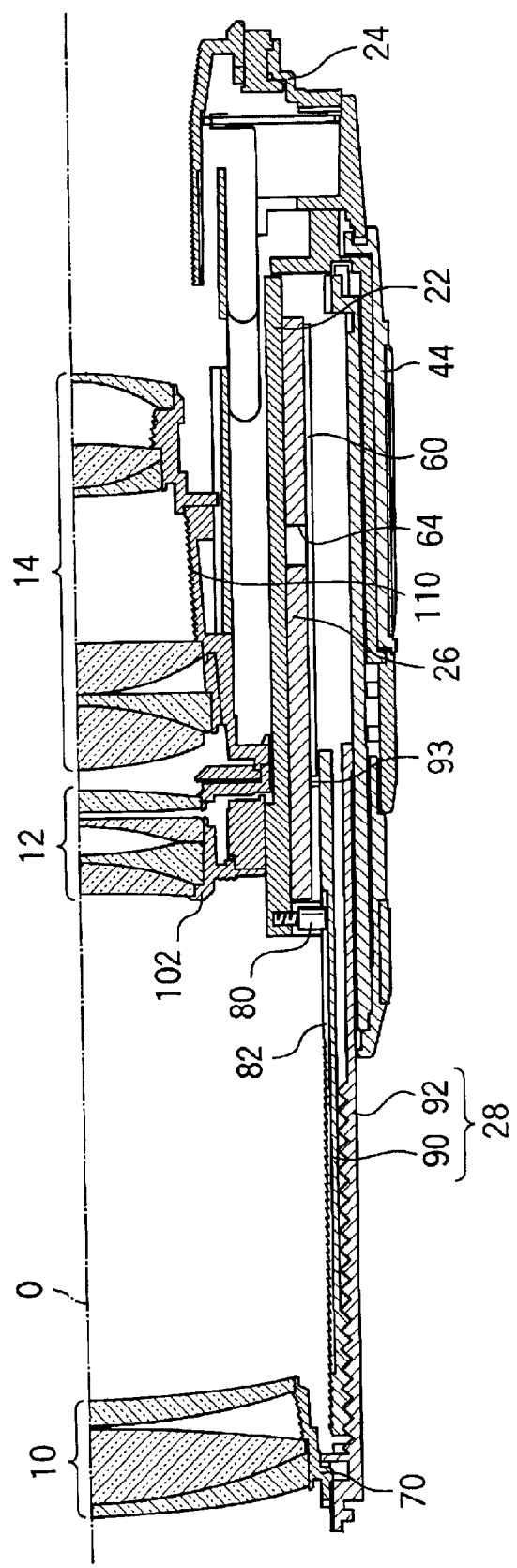
FIG. 2 is a sectional view showing the zoom lens being in tele-mode.

The barrel 28 in relation with the first group of lenses, which supports a frame 70 holding the first group 10 of lenses, includes a helicoid inner barrel 90 and a helicoid outer barrel 92 which is screwed over and mated with the inner barrel and fixedly supports the frame 70 holding the first group of lenses. In the helicoid inner barrel 90, as shown in FIG. 2, the groove 82 is defined for linear movement of the first stud 80 fitted therein, beyond and ahead of the cam barrel 26 fixed to the first fixed barrel 22. The helicoid outer barrel 92 has its hind portion coupled to the focus adjusting ring 40 by a rotating member (not shown) so as to slide along the optical axis O relative to the second fixed barrel 30, and the barrel is also engaged with the ring 40 to receive rotational movement from the same.

The barrel 28 in relation with the first group of lenses has its helicoid inner barrel 90 provided with cam followers 93 that are engaged with the raised cams 60 in relation with the first group of lenses. The frame 102 holding the second group 12 of lenses is fixed with pins 104 in relation with the second group of lenses and partially shaped in upside-down truncated cones, which slide in the cam grooves 62 in relation with the second group of lenses and in the grooves 54 for linear movement of the second and third groups of lenses. The frame 110 holding the third group 14 of lenses is fixed with pins 112 partially shaped in upside-down truncated cones, which slide in the cam grooves 64 in relation with the third group of lenses and in the grooves 54.

An operation of the zoom lens having the aforementioned configuration will now be described. In zooming, the zoom adjusting ring 44 is turned to rotate the cam barrel 26 over the first fixed barrel 22. As the cam barrel 26 rotates, the barrel 28 in relation with the first group of lenses, which is restricted in its rotational movement due to the engagement of the stud 80 with the groove 82, moves around the optical axis O, following a trajectory determined by the cam mechanism, by virtue of the engagement of the raised cams 60 with the cam followers 93. The frame 102 holding the second group of lenses, which is restricted in its rotational movement due to the engagement of the pins 104 for the second group of lenses with the grooves 54 for linear movement of the second and third groups of lenses, moves relative to the optical axis O, following a trajectory determined by the cam mechanism, by virtue of the engagement of the pins 104 with the cam grooves 62.

In addition to that, the frame 110 holding the third group of lenses, which is restricted in its rotational movement due to the engagement of the pins 112 with the grooves 54 for linear movement of the second and third groups of lenses, moves relative to the optical axis O, following a trajectory determined by the cam mechanism, by virtue of the engagement of the pins 112 with the cam grooves 64. In this way, the zooming is performed.

In focusing, the focus adjusting ring 40 is turned to make a rotation member (not shown) transmit the rotation to revolve the helicoid outer barrel 92. Meanwhile, the helicoid inner barrel 90 is restricted in its rotational movement due to the stud 80 fixed to the first fixed barrel 22 and the groove 82 for linear movement, and instead, the helicoid outer barrel 92 holding the frame 70 in relation with the first group of lenses, while screwing on and off the helicoid inner barrel 90, moves relative to the optical axis O along a trajectory determined by the cam mechanism. In this way, the focusing is attained.

Thus, according to the present invention, there are provided a lens barrel having a cam barrel which can be molded without undercuts, and a molding die to produce such a cam barrel.

Also, according to the present invention, there is provided a lens barrel having a cam barrel where there is no parting line in either the cam grooves nor the raised cams, and a cam barrel molding die to produce such a cam barrel.

These objects, advantages, and features of the present invention have been given only by way of examples but not for limitations, and therefore, it should be noted that any person having ordinary skills in the art would appreciate that there should be a variety of variations and modifications of the best modes as described above, without departing the true spirit and scope of the present invention as defined in the appended claims.

What is claimed is:

1. A lens barrel comprising a cam barrel of synthetic resin, the cam barrel having its outer surface provided with raised cams, each of the raised cams having at least one cam face inclined toward an opposite cam face off a radial direction relative to an optical axis, the cam face opposed to the inclined one extending in the radial direction relative to the optical axis.

2. A cam barrel of synthetic resin used in a lens barrel, comprising cam grooves and raised cams in the outer surface, each of the raised cams having at least one cam face inclined toward an opposite cam face off a radial direction relative to an optical axis, the cam face opposed to the inclined one extending in the radial direction relative the optical axis.

* * * * *